United States Patent
Kim

(10) Patent No.: US 10,742,270 B1
(45) Date of Patent: Aug. 11, 2020

(54) DISTRIBUTED ANTENNA SYSTEM FOR COMMERCIAL TELEPHONE AND WI-FI SERVICE

(71) Applicant: ADVANCED RF TECHNOLOGIES, INC., Burbank, CA (US)

(72) Inventor: Dae Woong Kim, Burbank, CA (US)

(73) Assignee: Advanced RF Technologies, Inc., Burbank, CA (US)

( * ) Notice: Subject to any disclaimer, the term of this patent is extended or adjusted under 35 U.S.C. 154(b) by 0 days.

(21) Appl. No.: 16/440,502

(22) Filed: Jun. 13, 2019

Related U.S. Application Data

(60) Provisional application No. 62/813,377, filed on Mar. 4, 2019.

(51) Int. Cl.
| | |
|---|---|
| *H04B 7/024* | (2017.01) |
| *H04L 5/14* | (2006.01) |
| *H04B 7/0456* | (2017.01) |
| *H04B 7/0452* | (2017.01) |

(52) U.S. Cl.
CPC .......... *H04B 7/024* (2013.01); *H04B 7/0452* (2013.01); *H04B 7/0456* (2013.01); *H04L 5/1423* (2013.01)

(58) Field of Classification Search
CPC .... H04B 7/024; H04B 7/0456; H04B 7/0452; H04L 5/1423
See application file for complete search history.

(56) References Cited

U.S. PATENT DOCUMENTS

| | | | | |
|---|---|---|---|---|
| 6,014,372 A | * | 1/2000 | Kent .................... | H04B 7/2041 370/316 |
| 8,681,916 B2 | * | 3/2014 | Braz .................... | H04L 7/06 375/364 |
| 9,130,613 B2 | * | 9/2015 | Oren .................... | H04B 7/022 |
| 10,148,347 B2 | * | 12/2018 | Berlin ................ | H04B 7/2606 |
| 10,200,267 B2 | * | 2/2019 | Zafer .................. | H04L 41/142 |
| 10,270,553 B2 | * | 4/2019 | Shim .................. | H04J 3/10 |
| 10,383,171 B2 | * | 8/2019 | Kim .................... | H04W 88/085 |

\* cited by examiner

*Primary Examiner* — Dac V Ha

(74) *Attorney, Agent, or Firm* — Lewis Roca Rothgerber Christie LLP

(57) ABSTRACT

An integrated antenna distributed system incorporates various types of communication signals, such as mobile communication signals, public safety signals, Wi-Fi signals, and other types of communication signals. Such a system uses a single reference signal to support MIMO using a single optical cable or a single fiber optic cable, and a signal from a remote location, to support commercial telecommunication services and Wi-Fi services simultaneously. The reference signal is used for frequency stability of remote units (RUs) connected to the head end (HE). For example, a reference signal is selected and sent from the HE to RUs, a bandwidth and frequency conversion of signals to be transmitted is specified and/or performed, a RU receives the converted signals and the reference signal from the HE, where the converted signals may be frequency or band-constrained, and the converted signals are converted at the RUs back to their original frequencies or bands.

20 Claims, 20 Drawing Sheets

| Category | Type | Frequency Bandwidth | Maximum Cable length | Speed | Applications & Notes |
|---|---|---|---|---|---|
| Cat 1 | | 0.4 MHz | | 1 Mbps | Telephone and modem lines(not described in EIA/TIA recommendations and not suitable for modem systems) |
| Cat 2 | | | | 4 Mbps | Older Terminal Systems(not described in EIA/TIA recommendations and not suitable for modem systems) |
| Cat 3 | UTP | 16 MHz | 100m | 16 Mbps | 10BASE-T & 100BASE-T4 Ethernet(Described in EIA/TIA-568. Not suitable for speeds > 16 Mbps Commonly used for telephone cables) |
| Cat 4 | UTP | 20 MHz | 100m | 20 Mbps | 16 Mbps Token Ring(Not commonly used these days) |
| Cat 5 | UTP | 100 MHz | 100m | 100 Mbps | 100BASE-TX & 1000BASE-T Ethernet(Commonly found in most of the LAN implementations) |
| Cat 5e | UTP | 100 MHz | 100m | 1 Gbps | 100BASE-TX & 1000BASE-T Ethernet(Cat5 Enhanced. Same structure as Cat5, but with better testing standards) |
| Cat 6 | UTP | 250 MHz | 100m | 1 Gbps | 1000BASE-T Ethernet(SFS-EN 50173-1) |
| Cat 6e | | 250 MHz (500 MHz in some cases) | 100m | | Not a standard; it's a proprietary of cable manufacturers. |
| Cat 6a | | 500 MHz | 100m | 10 Gbps | 10GBASE-T Ethernet(ISO/IEC 1181:2002 Amendment 2) |
| Cat 7 | S/FTP | 600 MHz | 100m | 10 Gbps | Telephone, CCTV, 1000BASE-TX in the same cable. 10GBASE-T Ethernet(Contains Four pairs, S/FTP : Shielded pairs, Braid-screened cable. ISO/IEC 11801 2nd Ed.) |
| Cat 7a | | 1000 MHz | | | Telephone, CCTV, 1000BASE-TX in the same cable. 10GBASE-T Ethernet(Contains Four pairs, S/FTP : Shielded pairs, Braid-screened cable. ISO/IEC 11801 2nd Ed. Amendment 2) |
| Cat 8 | | 1200 MHz | | | Under Development(Four pairs, S/FTP: Shielded pairs, Braid-screened cable, it's a standard under development) |

FIG. 23

DISTRIBUTED ANTENNA SYSTEM FOR COMMERCIAL TELEPHONE AND WI-FI SERVICE

CROSS-REFERENCE TO RELATED APPLICATION

The present application claims priority to and the benefit of U.S. Provisional Patent Application No. 62/813,377, filed Mar. 4, 2019, the contents of which are hereby incorporated by reference in their entirety.

BACKGROUND

Field

Embodiments of the present invention relate generally to a distributed Antenna System (DAS), and more specifically to an integrated distributed Antenna System (DAS) that integrates various types of communication signals such as mobile communication signals, public safety signals, Wi-Fi signals, and other types of communication signals.

Description of Related Art

Mobile communications continue to develop, where improved mobile communication infrastructures coexist with diverse types of mobile communication networks, and are provided with second generation, third generation, and fourth generation services. Multi-Band Multi-Mode systems are generally required to support and connect these various kinds of networks. These multi-band multi-mode systems have a need to cover all of the communication networks corresponding to multiple bandwidths, or deliver large amounts of signals to deliver various services.

In the United States, in an environment where diverse communication services are provided and diverse kinds of communication terminals are supplied, telecommunications operators and landlords are working to provide the best quality service to customers or tenants. Typically, operators try to resolve or improve areas of shade, or low and/or no signal, in buildings. Shaded areas are areas where the communication signals may not be transmitted or otherwise communicated properly.

SUMMARY

Shaded areas or other areas with weak or no signal can generally be removed, for example, by installing base stations and antenna dispersion devices in the shaded area, or by installing one or more Bi-Directional Amplifiers (BDAs) and antenna dispersion devices.

In these circumstances, carriers have a need to provide a lot of data at the same time to provide the best quality services to their customers.

However, if there is already an existing installation or devices already installed, and additional installations are desired, the process may become complicated. The problem of installing a new infrastructure to add to an existing infrastructure, of installing or adjusting the infrastructure on the whole combined system, and of installing the installation infrastructure itself can become very complex. Therefore, adding new installations to existing infrastructures may take considerable time and money.

Thus, embodiments of the present invention have been proposed in order to solve the above problems, and it is an object of the present invention to provide a wireless communication system which integrates a wide range of signals from existing facilities, and integrates various types of communication signals, so that the system can be implemented easier and at lower costs.

If an operator wants to add a large number of users onto a same band on existing installed computers, or if a new device or devices are installed without a light cable, for example, due to cost constraints, or if massive multiple Input/Output (I/O) signals need to be sent at the same time, services may need to be provided at low cost, and when only one optical cable is installed in the building.

BRIEF DESCRIPTION OF THE DRAWINGS

These and/or other aspects, features, and advantages of the disclosure will become apparent and more readily appreciated from the following description of example embodiments, taken in conjunction with the accompanying drawings, of which:

FIG. 23 shows a table representing various categories of UTP cables.

DETAILED DESCRIPTION

Purposes, features, and benefits of embodiments of the invention will become clearer through the following detailed descriptions relating to the attached drawings. In addition, some details related to embodiments of the invention may be omitted if specific descriptions of those details have been deemed to be unnecessary to understand the described embodiments of the invention. The attached drawings shall further be consulted to provide a more detailed description of various exemplary embodiments according to the invention.

Cable is a medium through which information usually moves from one network device to another. There are several types of cable which are commonly used with local area networks (LANs). The type of cable chosen for a network is related to the network's topology, protocol, and size, among other factors. Understanding the characteristics of different types of cable and how they relate to other aspects of a network is necessary for the development of a successful network.

Some typical cable types that are used in Wi-Fi networks are unshielded twisted pair (UTP) cables, shielded twisted pair (STP) cables, coaxial cables, and fiber optic cables.

Figure 1:
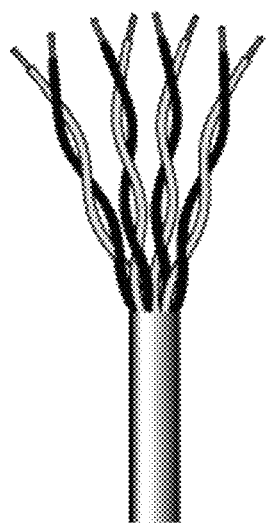
FIG. 1 is a schematic drawing of an unshielded twisted pair (UTP) cable.

Twisted pair cabling generally comes in two varieties: shielded and unshielded. Unshielded twisted pair (UTP) cables are the most popular to implement. A schematic of a typical UTP cable is shown in FIG. 1.

The quality of UTP cables may vary from telephone-grade wire to extremely high-speed cable. The cable has four pairs of wires housed inside a jacket. Each pair is twisted with a different number of twists per inch to help eliminate interference from adjacent twisted pairs and other electrical devices. The tighter the twisting, the higher the supported transmission rate and the greater the cost per foot. FIG. 23 provides a table that shows that the EIA/TIA (Electronic Industry Association/Telecommunication Industry Association) has established standards of UTP cables and rated seven categories of wire, with an eighth category under development.

As shown in FIG. 23, the UTP cable generally has a transmission distance of 100 meters. Therefore, in order to realize a stable system at a distance exceeding 100 meters, transmission using an optical cable may be required.

Figure 2:
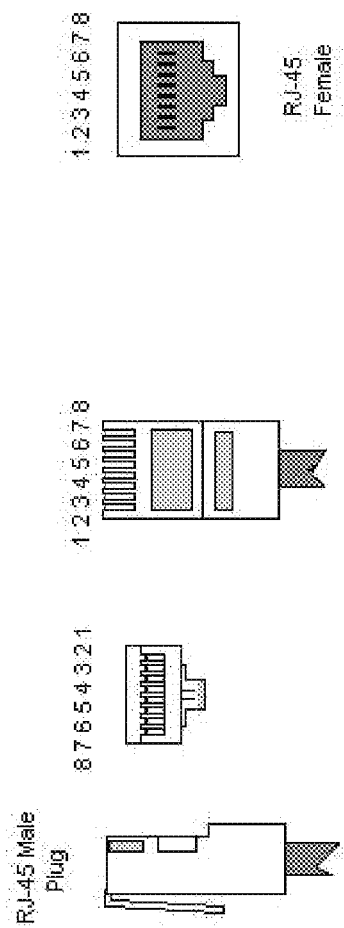
FIG. 2 is a schematic representation of a standard RJ-45 connector, including pin numbers, for a UTP cable.
Figure 3:
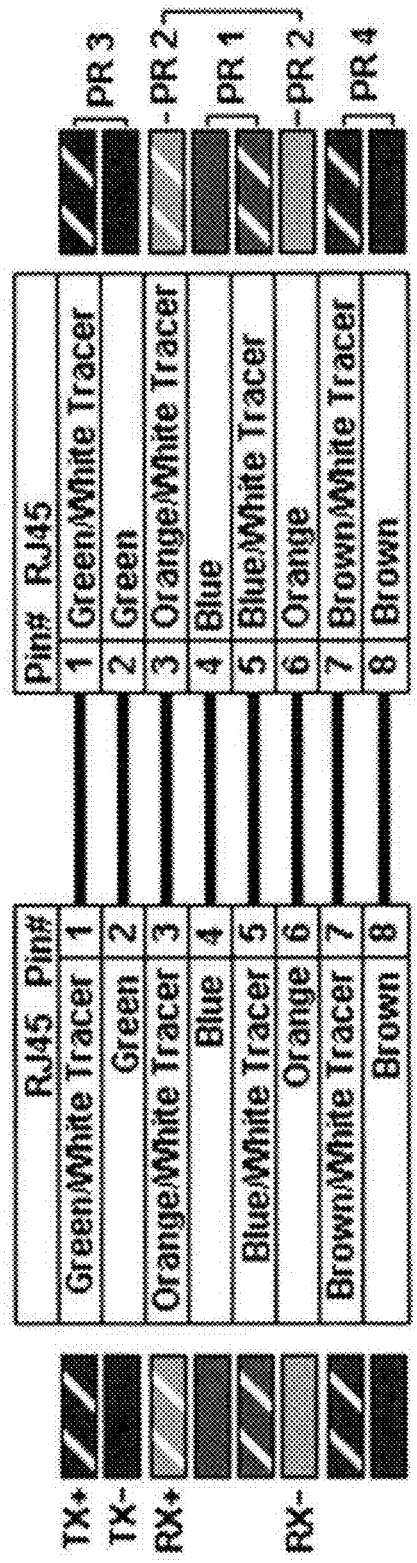
FIG. 3 is a representation between the T-568A and T-568A, the transmitter (TX) pin on the UTP serial Ethernet cable.
Figure 4:
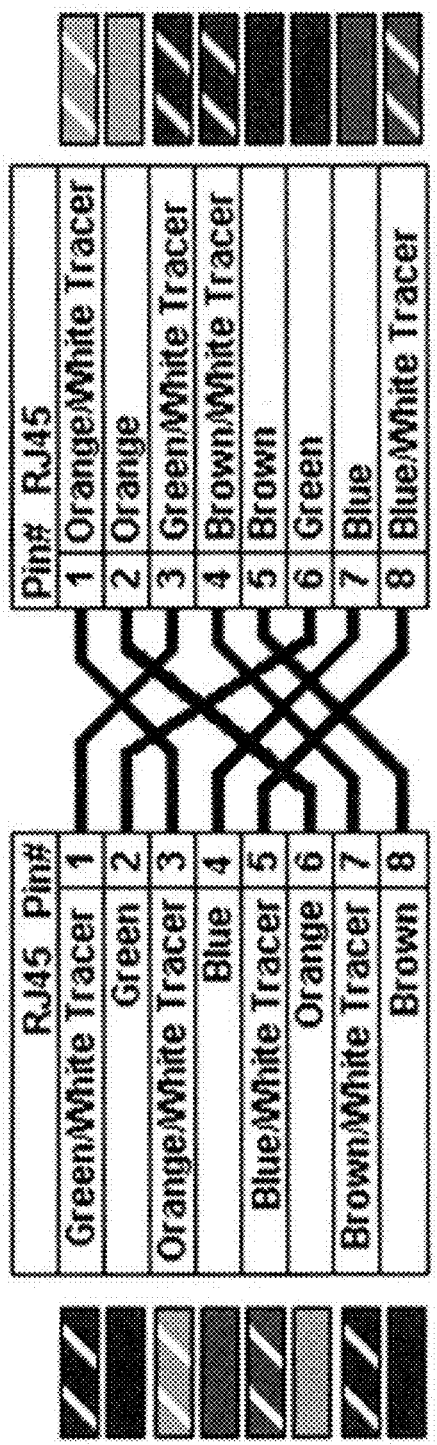
FIG. 4 is a representation of the TX pin on the UTP crossover Ethernet cable between T-568A and T-568B.

FIG. 2 shows a standard connector for an unshielded twisted-pair (UTP) cable, an RJ-45 connector. This is a plastic connector that looks like a large telephone-style connector. A slot allows the RJ-45 to be inserted only one way. RJ stands for Registered Jack, implying that the connector follows a standard borrowed from the telephone industry. FIGS. 3 and 4 respectively show the EIA/TIA 568A and EIA/TIA 568B standards specified by the EIA/TIA. This standard designates which wire is associated with each pin inside the connector.

FIG. 3 shows that between the T-568A and T-568A, the transmitter (TX) pin on the UTP serial Ethernet cable is connected to the corresponding receiver (RX) pin in a positive and a negative minus connection. It can be seen that the wire pairs of pins 4, 5, 7 and 8 are not used.

FIG. 4 shows that the TX pin on the UTP crossover Ethernet cable between T-568A and T-568B is connected to the corresponding RX pin in positive and negative minus. It can be seen that the wire pairs of pins 4, 5, 7 and 8 are not used.

Although UTP cable is the least expensive cable, it may be susceptible to radio and electrical frequency interference. If a cable is placed in environments with lots of potential interference, or if a cable is placed in extremely sensitive environments that may be susceptible to the electrical current in the UTP, shielded twisted pair (STP) cables may provide a better solution. Therefore, shielded cables are also used to extend the maximum distance of the cable.

STP cables are available in three different configurations, cables where each pair of wires is individually shielded with foil, cables where a foil or braid shield is positioned inside the jacket to cover all of the wires together as a group, and cables where shields are placed both around each individual pair of wires as well as around the entire group of wires (which is referred to as a doubled STP cable).

As reflected in FIG. 23, the transmission distance of the UTP cable is typically approximately 100 meters. However, there are many areas where the distance required for a cable to traverse is several hundred meters, for example, within a large building or stadium, e.g., between an antenna of a router and a terminal. Therefore, an object of embodiments of the invention is to solve such distance issues and to provide more reliable service by providing general communication equipment that can be implemented as a single device in a building.

Accordingly, embodiments of the present invention relate to a method of integrating an antenna distribution system, for example, in a building, and a Wi-Fi system, and transmitting the same to a remote unit using a single optical cable or an already installed optical cable and using one antenna.

Figure 5:
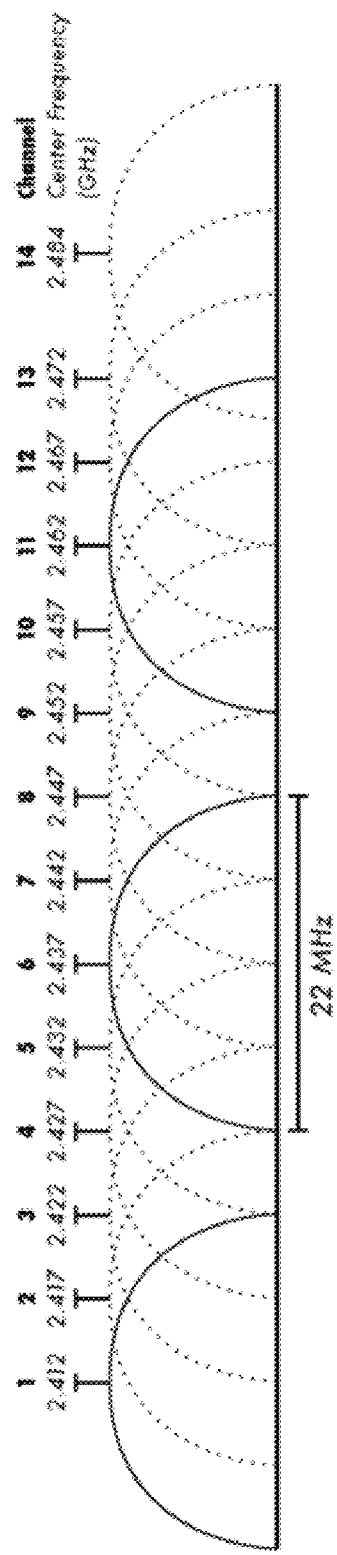
FIG. 5 is a representation of the Institute of Electrical and Electronics Engineers standard (IEEE) 802.11 Wi-Fi channel (2.4 GHz) bandwidth channel layout.

FIG. 5 shows the IEEE 802.11 Wi-Fi channel (2.4 GHz) bandwidth channel layout. According to the IEEE 802.11 standard, Wi-Fi devices can operate on eleven channels (channels 1 through 11) located in the 2.4-GHz Industrial, Scientific, Medical (ISM) band spanning from 2400 MHz to 2483.5 MHz. Each Wi-Fi channel is 22 MHz wide, and consecutive Wi-Fi channels are separated by 5 MHz. Channels 1, 6, and 11 are non-overlapping channels whose center points are 2412 MHz, 2437 MHz, and 2462 MHz, respectively. Most Wi-Fi devices use one of channels 1, 6, and 11, and the selected channel is used for both transmit and receive functions.

Figure 6:
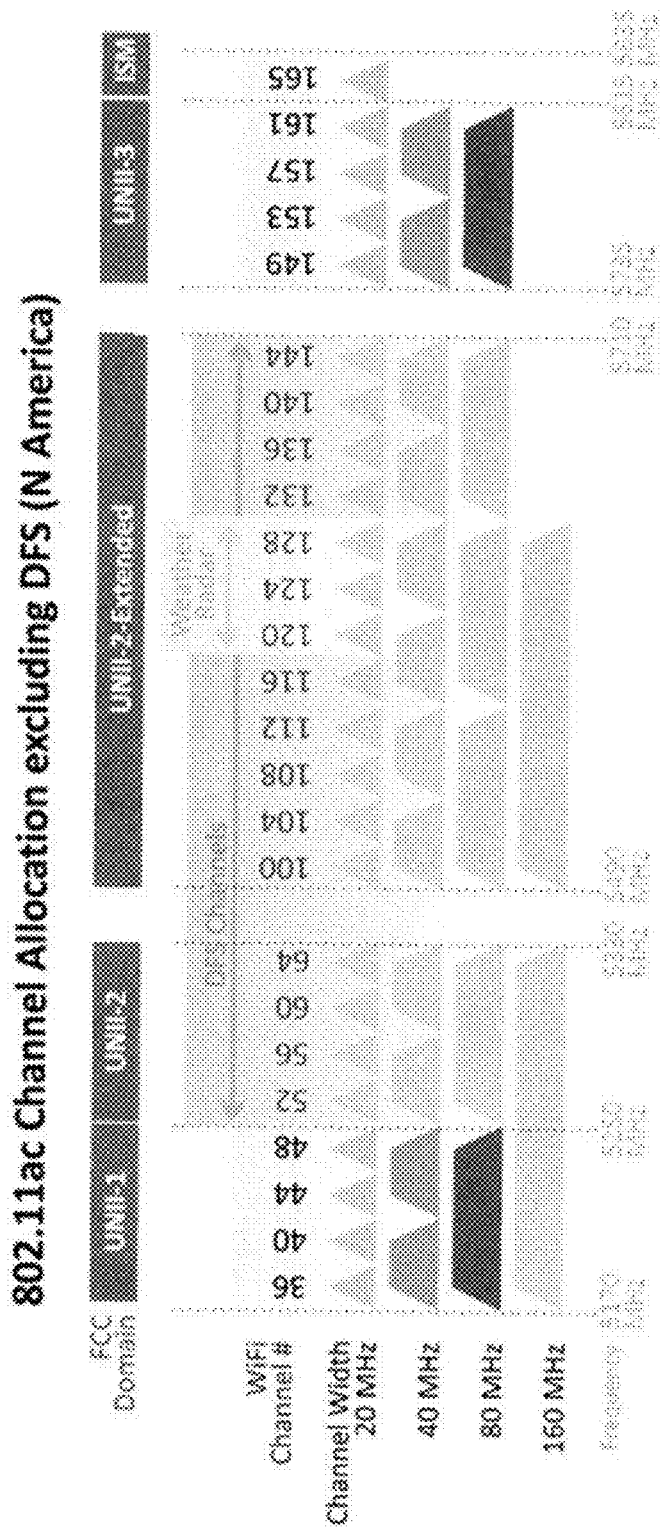
FIG. 6 is an example of a 5 GHz Wi-Fi band channel layout for 802.11ac Gigabit Wi-Fi.

FIG. 6 shows a 5 GHz Wi-Fi band channel layout for 802.11ac Gigabit Wi-Fi services, which can support larger channels at 80 MHz and 160 MHz widths, which are wider compared to the 2.4 GHz Wi-Fi bands. This is one of the primary drivers behind increased peak performance and bandwidth of wireless access points (APs) and clients.

Therefore, the present apparatus performs frequency conversion according to the channel rules specified by the IEEE, in order to prevent mutual interference between the converted Wi-Fi frequencies or damage the Federal Communications Commission (FCC) spectral mask.

Figure 7:
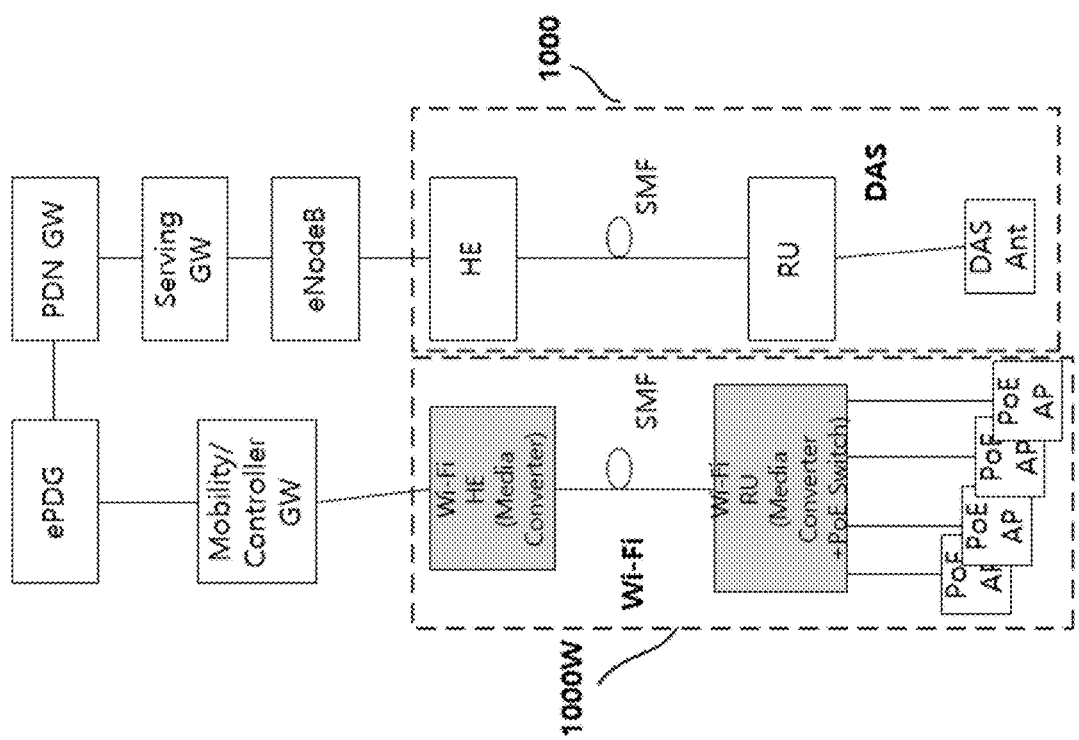
FIG. 7 is a schematic example of a specific configuration of the Wi-Fi transceiver of a remote unit (RU) and frequency Shifter of a system shown in FIG. 13, corresponding to an LTC and Wi-Fi network interworking structure.

In FIG. 7, user equipment (UE) sends a UE packet to the serving gateway (S-GW) through the GPRS tunneling protocol (GTP) tunnel, where GPRS is the General Packet Radio Services standard. The S-GW then transmits the GTP tunnel to the E-UTRAN node B (eNB) through the GTP tunnel, for example, to the packet data network (PDN) gateway, or P-GW. The P-GW removes the GTP tunnel header and forwards the packet to the Internet (e.g., PDN or IP network).

On the other hand, when a packet is received from the Internet through the P-GW, the GTP tunnel between the P-GW and the S-GW and the GTP tunnel between the S-GW and the eNB are transmitted to the UE.

Also, In FIG. 7, if the UE briefly describes the connection to the Wi-Fi network, the Wi-Fi network may be subscribed based on Extensible Authentication Protocol (EAP) or may be web-based authentication, or unauthenticated. For EAP-based authentication, the UE can authenticate, for example, with the 3GPP AAA and/or the EAP-AKA protocols through the AP.

If or when the Wi-Fi network authentication procedure is finished, the UE is assigned an IP address, which can be given by the AP or given through a separate dynamic host configuration protocol (DHCP). If DHCP server exists separately, the AP operates as a DHCP Relay.

Figure 8:
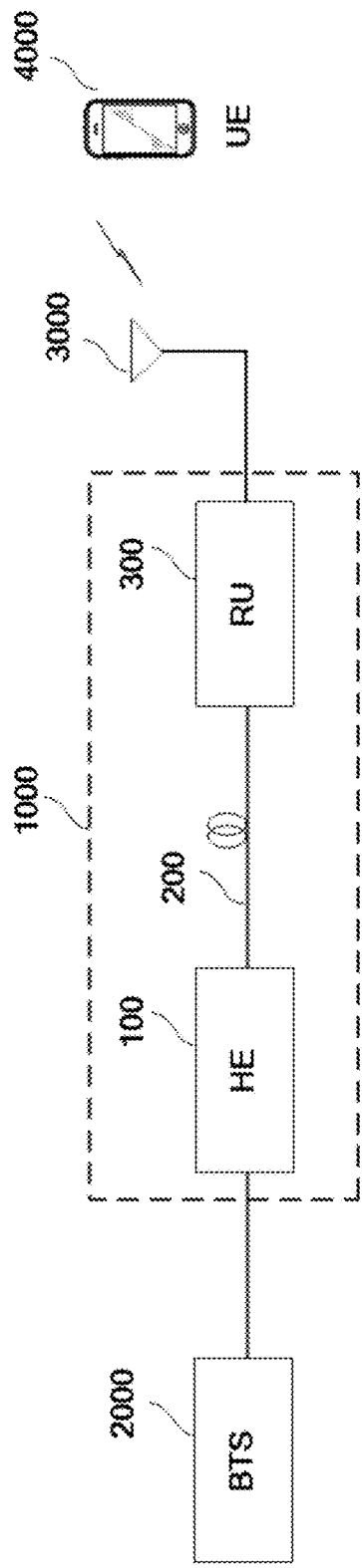
FIG. 8 is a schematic representation of a configuration of an antenna distributed inside and outside a typical building using a single I/O signal.
Figure 9:
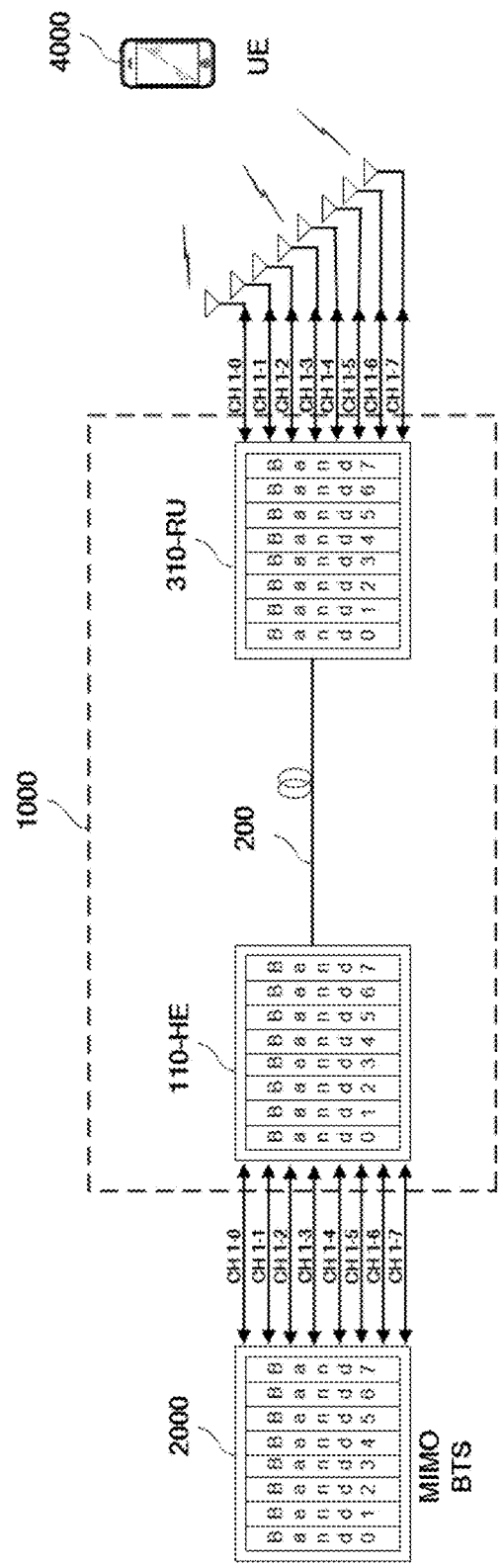
FIG. 9 is a schematic representation of a configuration of an antenna distributed inside and outside a typical building using a multi I/O signal.

FIG. 8 is a schematic representation of a configuration of an antenna distributed inside and outside a typical building using a single input/output (I/O) signal, while FIG. 9 is a schematic representation of a configuration of an antenna distributed inside and outside a typical building using a multi I/O signal.

As illustrated in FIG. 8, the distributed antenna system (DAS) includes a Head End (HE) (100) connected to base stations (BTS) (2000). The HE 100 is also connected to multiple Remote Units (RUs) (300) through optic fiber cable, and can be further connected to a tower, which can be installed inside the building.

Figure 10:
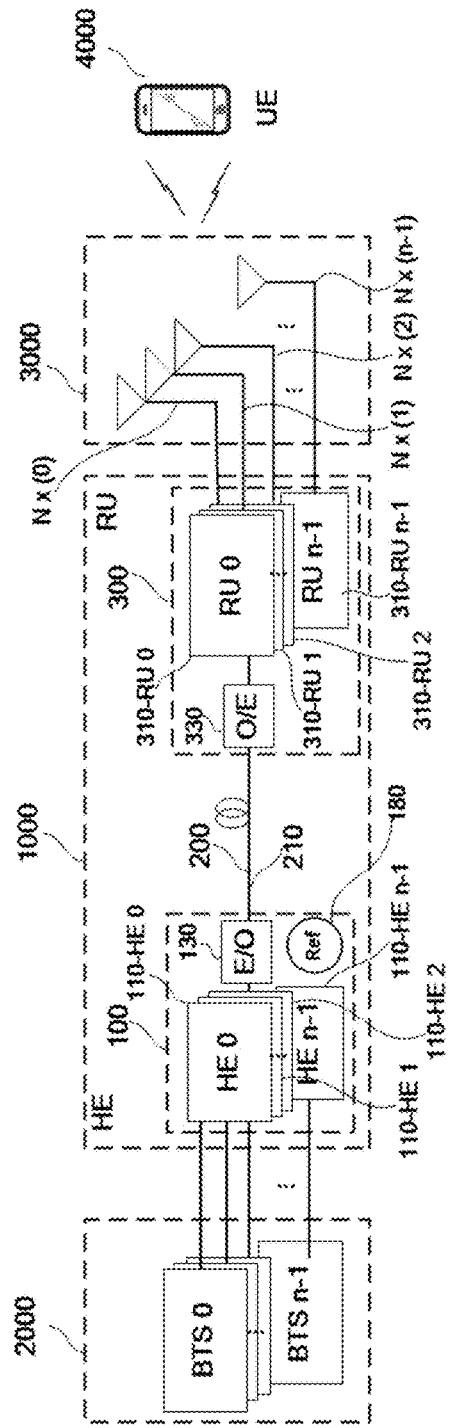
FIG. 10 is a schematic example of the specific configuration of the system of FIG. 8.

HE (100) is the main relay unit of the integrated antenna distribution unit. HE (100) receives RF signals from the base station 2000, and transmits the received RF signals to the RU (300) located at a remote location through fiber optical cables. Additionally, HE (100) transmits the RF signals received from the RU (300) to the base station (2000). FIG. 10 shows a more detailed version of the system of FIG. 8.

FIG. 9 is an example of a configuration capable of transmitting and/or receiving multiple inputs and outputs simultaneously.

The general structure of FIG. 9 is similar to that of FIG. 8. The multiple input multiple output (MIMO) signals are received simultaneously from several base stations (2000), and the HE (110) transmits the MIMO signals to multiple RUs (310) located at a remote area, through fiber optic cables.

Figure 11:
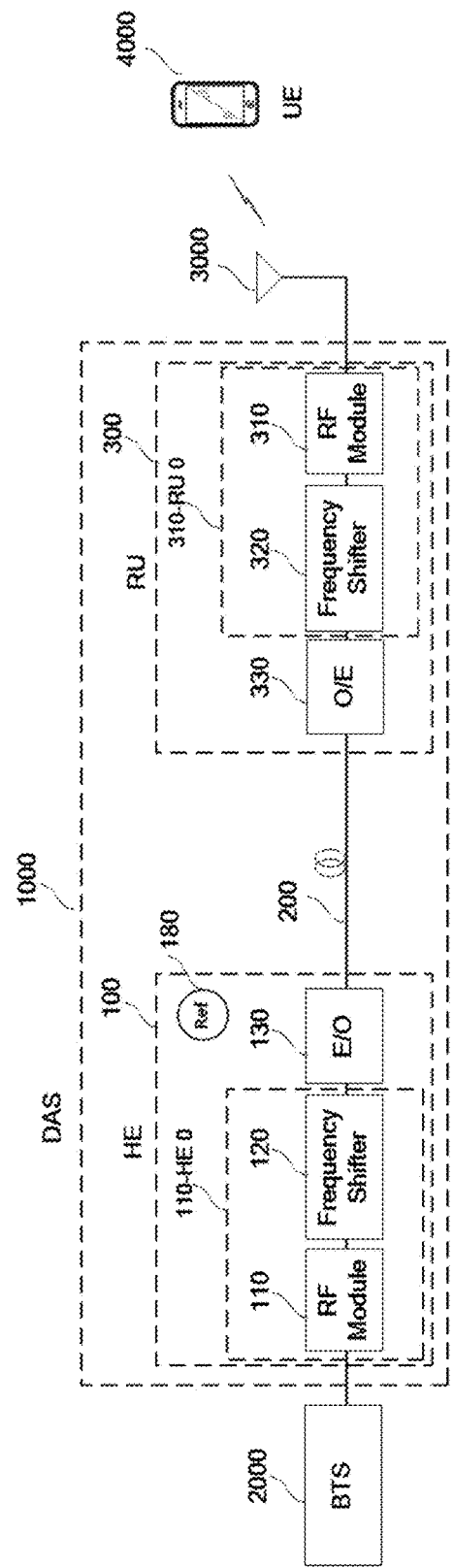
FIG. 11 is a schematic example of the specific configuration of the system of FIG. 9.

FIG. 11 shows a detailed configuration of the antenna distribution system according to the invention of FIG. 9.

FIG. 11 includes an HE (100) with an RF module (110) for adjusting the signals received from the base station 2000, a Frequency Shifter (120) for changing the frequency of the inputted multiple signals randomly, an electrical-to-optical converter (E/O) (130) for converting the inputted electrical signals to optical signals, and a Reference signal generator (180) for generating a reference signal used for frequency stability of the system, for example, when the frequency shifter of HE (100) and RU (300) changes an arbitrary frequency or frequencies.

Figure 12:
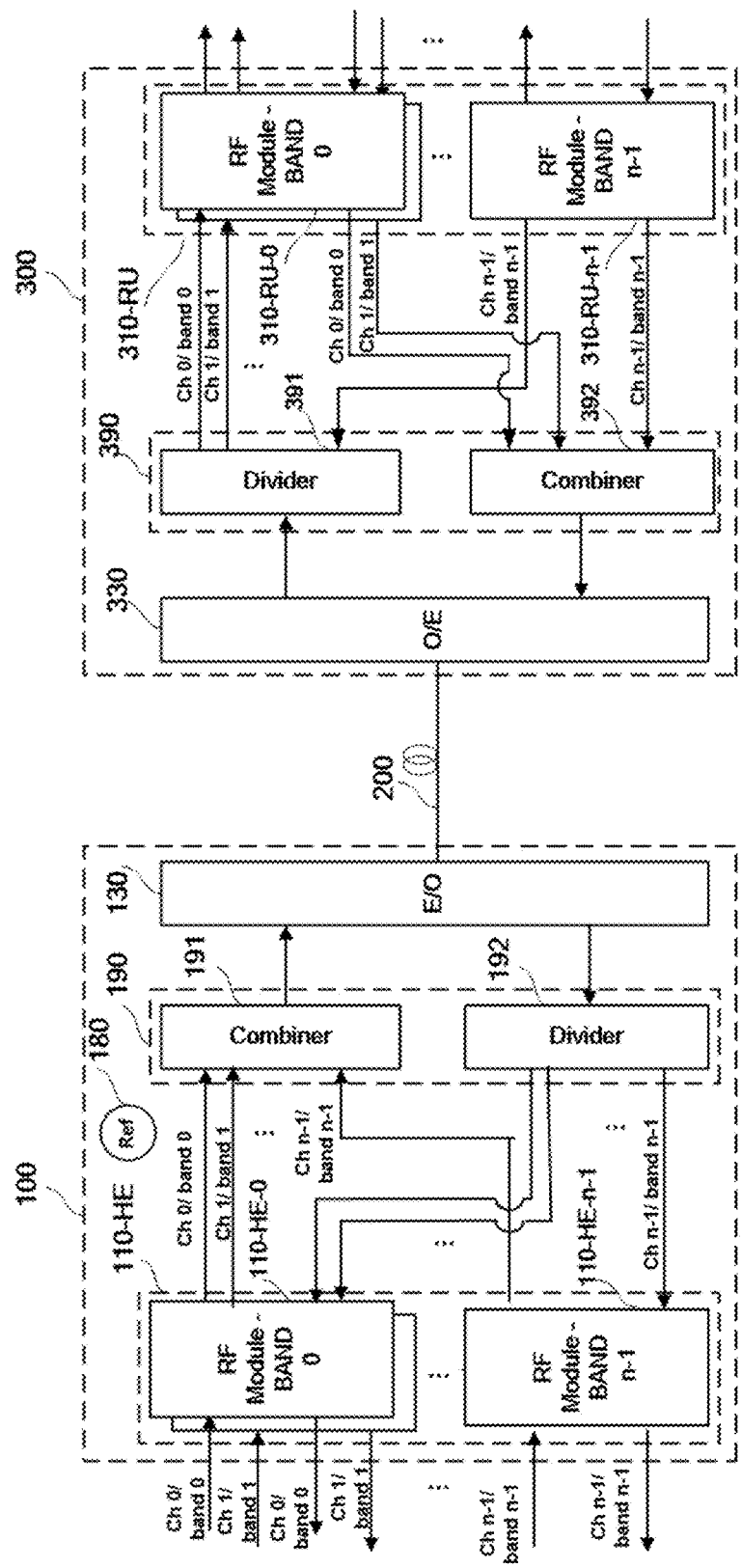
FIG. 12 is a schematic example illustrating a general configuration of the system FIG. 9.

FIG. 12 is an example of a more detailed configuration of the antenna distribution system with multiple inputs and outputs as described in FIGS. 9 and 11.

FIG. 12 shows a specific configuration of the antenna distribution system, where HE (100) includes an RF module (110) for adjusting signals received from the base station, a combiner/divider unit (190), an E/O (130) for converting the inputted electrical signals to optical signals, and a Reference signal generator (180) for generating a reference signal used for the frequency stability of the system.

Referring now to FIGS. 9, 11, and 12, in one embodiment, if the RF signal transmitted from the BTS is a MIMO signal (e.g., 2Tx2R, including two transmit signals and two receive signals), signals are amplified in the RF module (110) of HE (100), and a main DL signal is not converted in a frequency shifter (120). However, a sub DL signal is converted to a sub UL frequency signal. The converted sub UL frequency signal and main DL signal are transmitted to RU (300) in remote locations using E/O (130), the transmitted sub UL frequency signal is converted to have a frequency of the original sub DL signal via a frequency shifter (320). Each of the main DL signal and the sub DL signal is amplified respectively via the RF module (310) and sent to the UE (4000) via the antenna (3000).

For example, to satisfy the conditions of 8Tx8R (e.g., eight transmit signals and eight receive signals, which is a minimum condition for transmission of Massive MIMO) using one fiber optic cable, all DL signals received from BTS (2000) are converted to have the respective appropriate frequencies to avoid interference with each other using frequency shifter (120), and are transmitted to RUs (300) in remote locations using E/O (130), and the converted respective appropriate frequencies are re-converted to the original DL signal frequency, for example, via the frequency shifter (320). Also, the amplified DL signal from RF Module (310) is transmitted via the Massive Antenna (3000).

With the same principle, for UL signals transmitted from the UE (4000) via the antenna (3000), signals inputted to each channel of the RU (300) are amplified by the RF module (310), and each of the signals on each channel is converted to have a respective appropriate frequency to avoid interference with each other, and the signals are then transmitted to E/O (130) of HE (100) through fiber optic cable (200), and thereafter, each of the transmitted signals is re-converted to have their original UL frequency, for example, via frequency shifter (120). In addition, the amplified UL signals from RF Module (110) are sent to BTS (2000).

Figure 13:
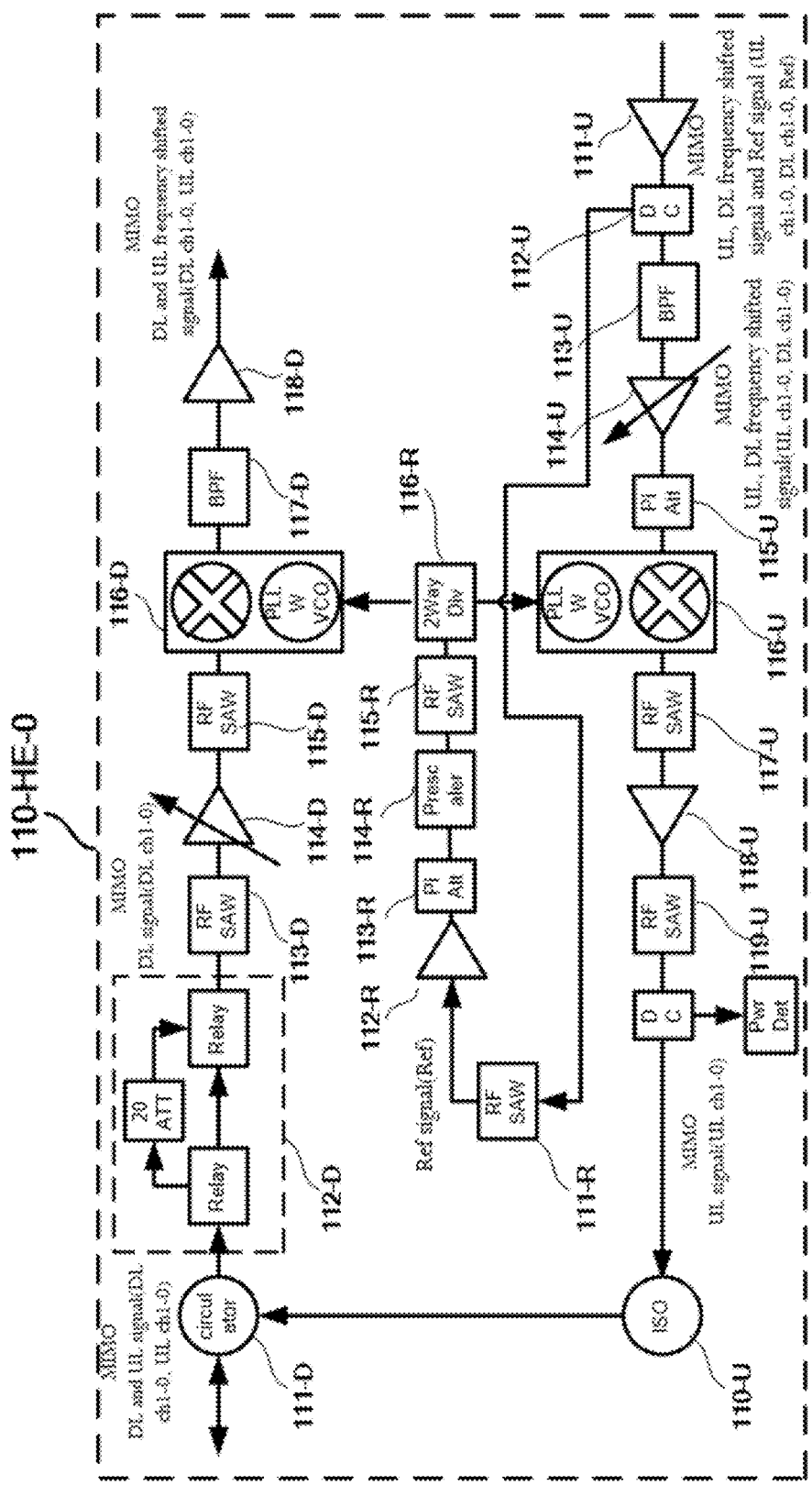
FIG. 13 is a schematic example of the specific configuration of a radio frequency (RF) module of a head end (HE) and frequency Shifter of the system of FIG. 12.

FIG. 13 is a detailed schematic diagram of an RF module 110 of the system of FIGS. 11 and 12. FIG. 13 shows an RF Module (110) and frequency shifter (120) of the system in FIGS. 11 and 12 in one module form.

Figure 14:
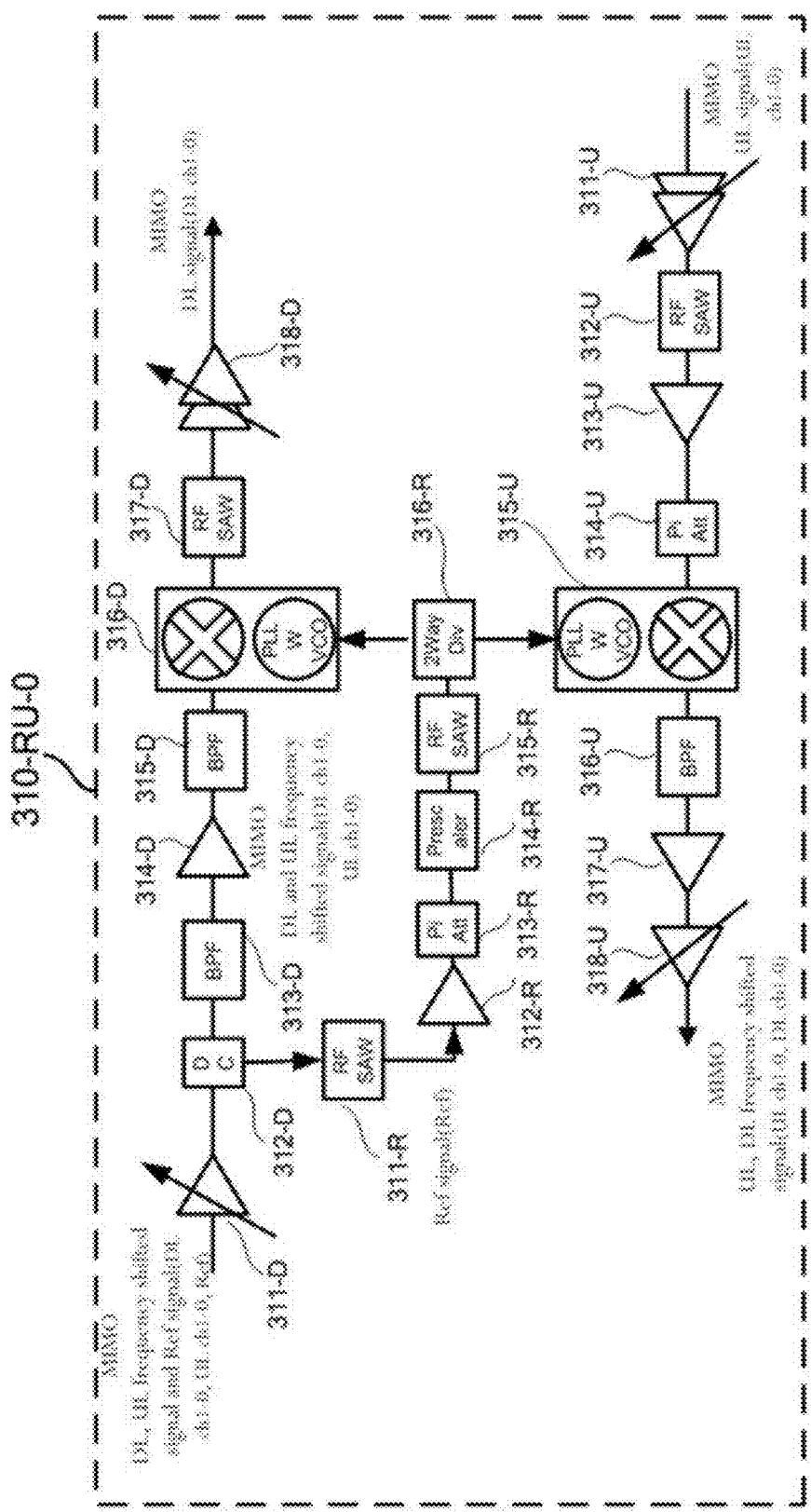
FIG. 14 is a schematic example of the specific configuration of the RF module of an RU and frequency Shifter of the system of FIG. 12.

FIG. 14 is a further detailed schematic diagram of FIGS. 11 and 12. FIG. 14 shows an RF module (310) and frequency shifter (320) of the system in FIGS. 11 and 12 in one module form.

The descriptions of FIG. 13 and FIG. 14 are similar to a service of Wi-Fi utilizing the time division duplex (TDD) method shown in FIGS. 15 and 16, so the details of FIGS. 13 and 14 are respectively described in conjunction with the descriptions of FIG. 15 and FIG. 16 below.

Figure 15:
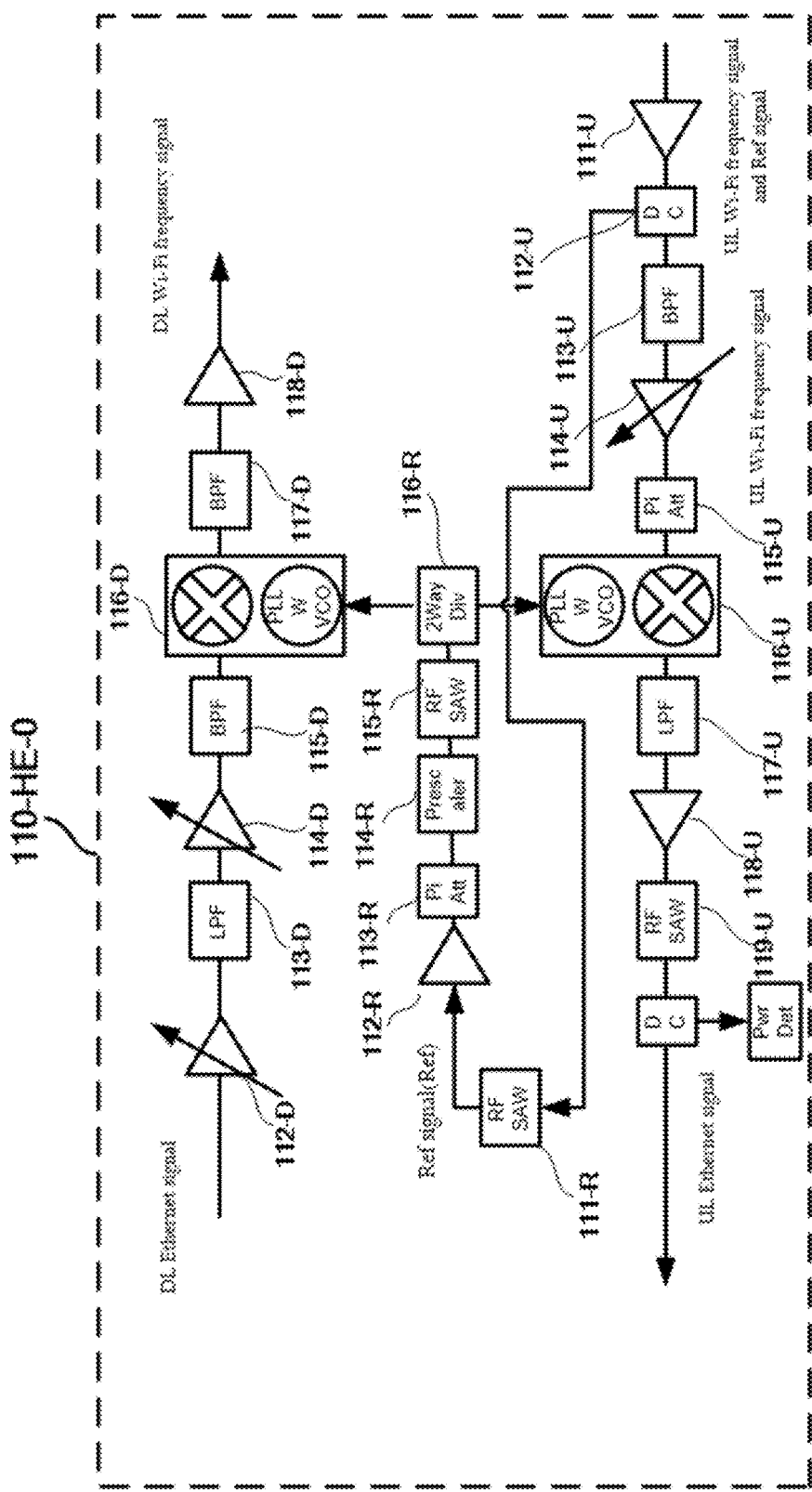
FIG. 15 is a schematic example of a specific configuration of a Wi-Fi Transceiver of an HE and a frequency Shifter, for example, of the systems of FIG. 12 and/or FIG. 19.

FIG. 15 is a more detailed block diagram of 110-HE-0 in FIGS. 11 and 12.

After receiving Ethernet signals (112-D, 114-D), for example, from the GateWay/Router's RJ-45 connector (TX+, TX−; pins 1 and 2), the received signals of an appropriate size can be filtered using filters 113-D, 115-D. Then, mixer (116-D) is utilized to convert the frequency. The Ethernet signals that are converted into the Wi-Fi frequency band are then transmitted to the O/E (330) of the Remote Units, for example, through the E/O (130).

The Ethernet signal of the UL Wi-Fi frequency band, for example, transmitted from the O/E (330) of the RU, through the E/O (130) of the HE, and is amplified by the amplifier (111-U). The Ethernet signal in the Wi-Fi frequency band is passed through the band-pass filter (113U), and then converted into the original Ethernet frequency signal in the frequency mixer (116-U), and the converted signal is then sent to the GateWay/Router's RJ-45 connector (RX+, RX−; pin 3, 6), for example, through a low-pass filter (117-U, 119-U).

A prescaler is a device that generates a slower timer clock by dividing a higher speed clock, in order to solve a problem that generally occurs when a slower timer is needed while using a high-speed clock. For example, if an input clock of 8 MHz is divided by four, the resulting clock becomes 2 MHz.

In FIG. 15, a signal inputted through a directional coupler (DC) (112-U) of 110-HE-0 passes a reference signal from a bandpass filter (111-R) through an amplifier (112-R). After amplification, the reference signal is input to the prescaler (114-R), and the input reference signal is divided to an appropriate size. The divided reference signal (e.g., where the frequency of the reference signal is lowered due to the frequency division ratio) is input to the phase-locked loop (PLL) of the frequency mixer (116-D, 116-U).

Figure 16:
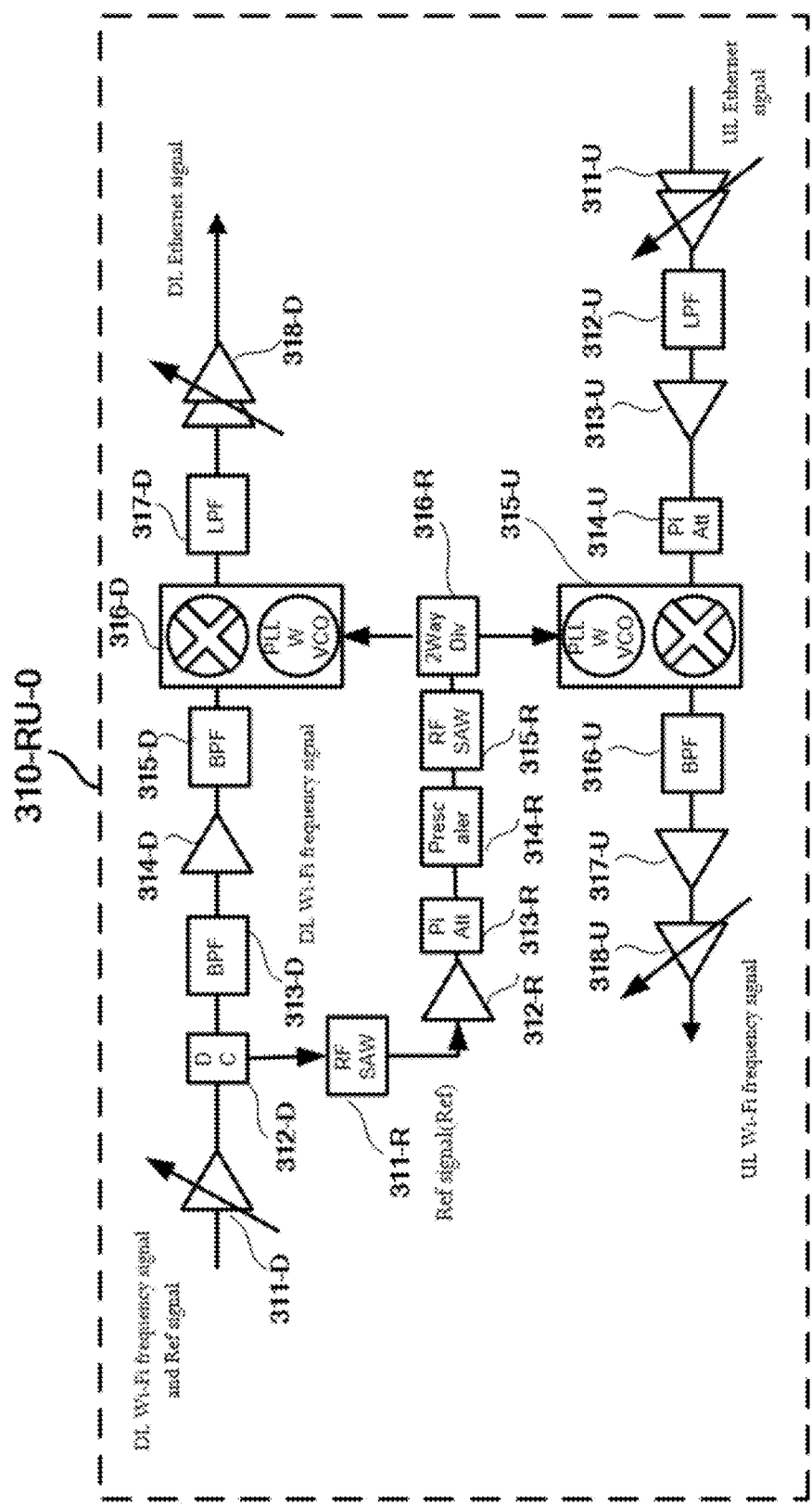
FIG. 16 is a schematic example of a specific configuration of a Wi-Fi Transceiver of an RU and a frequency Shifter, for example, of the systems of FIG. 12 and/or FIG. 19.

FIG. 16 is a more detailed block diagram of 310-RU-0 in FIGS. 11 and 12.

In FIG. 16, Ethernet signals converted into the Wi-Fi frequency band are input from the E/O (130) of the HE and the O/E (330) of the Remote Units to the amplifier (311-D). The converted signal includes an Ethernet signal and a reference signal converted into the input Wi-Fi frequency band. The Ethernet signal converted into the Wi-Fi frequency band passes through the band pass filters (313-D, 315-D) is converted into the original Ethernet frequency signal using the frequency mixer (316-D), and is then passed through the low pass filter (317-D) to the Wi-Fi RF integrated circuit (RFIC) module (e.g., 311M-S, 311M-D, 311M-2.4G, 311-5G, etc.), to the RJ-45 connector (TX+, TX−; pins 1 and 2).

On a similar principle, the Ethernet net signal from the RJ-45 connector (RX+, RX−; pins 3, 6) of the Wi-Fi RFIC (e.g., 311M-S, 311M-D, 311M-2.4G, 311-5G, etc.) is routed through the amplifier (311-U, 313-U) and filter (312-U) to convert the signal to a signal of a proper or desired size. The Ethernet net signal is converted to the frequency of the commercial Wi-Fi frequency band by the Ethernet signal in the frequency mixer (315-U). The converted Wi-Fi frequency signal is input to the E/O (330) through, for example, an amplifier (317-U) and one or more filters (316-U), and then transmitted to the E/O (130) of the HE.

In FIG. 16, the signal input through the directional coupler (DC) (312-D) of 110-RU-0 passes the reference signal through the bandpass filter (311-R). The signal passes through the amplifier (312-R), the amplified reference signal is input to the prescaler (314-R) after amplification, where the input reference signal is divided to an appropriate size. The divided reference signal (e.g., where the frequency of the reference signal is lowered due to the frequency division ratio) is then input to the PLL of the frequency mixer (316-D, 315-U).

In FIGS. 15 and 16, analog modulators can be used instead of the frequency mixers (116-D, 116-U, 316-D and 315-U) used in the frequency converters.

Figure 17:
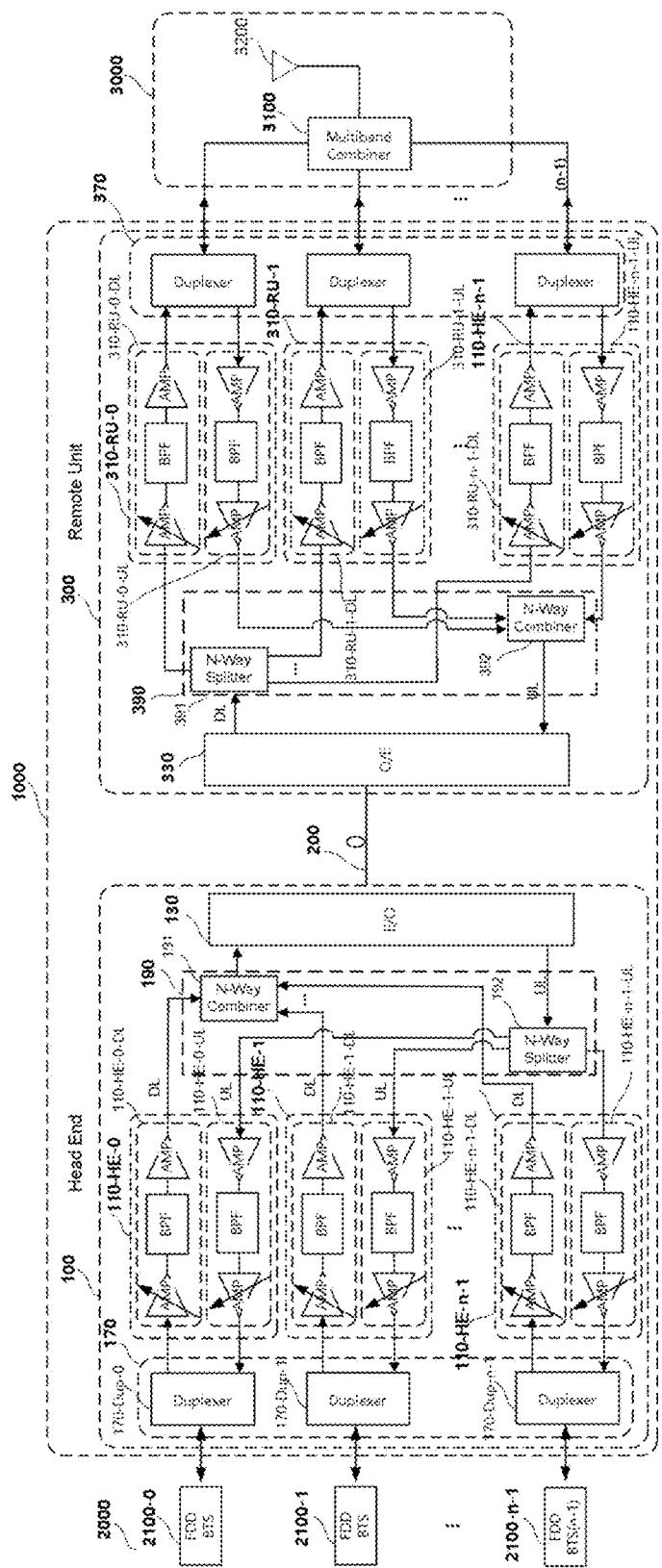
FIG. 17 is a schematic example of a Multi frequency division duplex (FDD) Configuration for a distributed antenna system (DAS) of the specific configuration of the system of FIG. 12.

FIG. 17 shows a Multi Band frequency division duplex (FDD) Configuration for DAS according to an embodiment of the invention.

The principle of operation is the same as or similar to the operation principles of FIG. 9 and FIG. 10. Therefore, the detailed description will be omitted.

Figure 18:
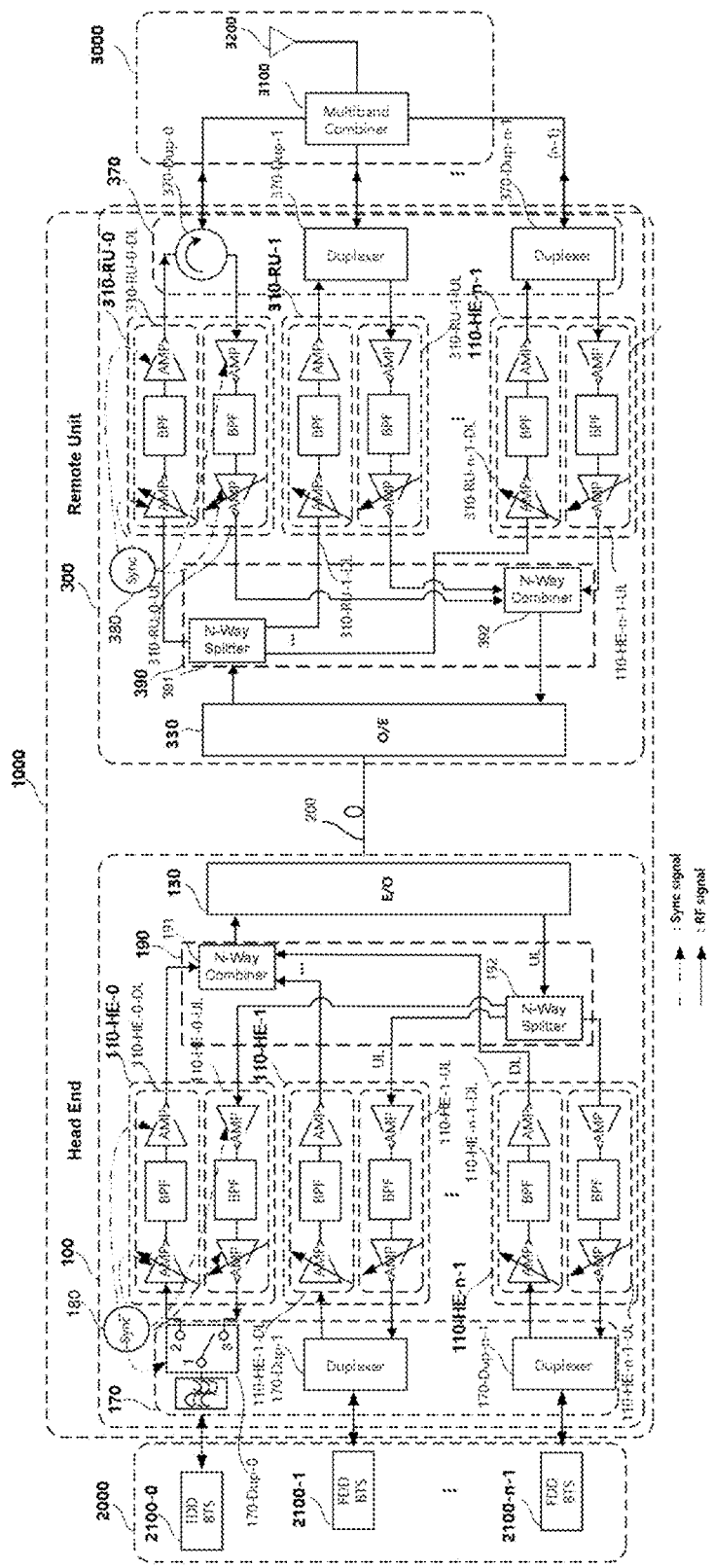
FIG. 18 is a schematic example of a time division duplex (TDD) and FDD Configuration for a DAS of the specific configuration of the system of FIG. 12.

FIG. 18 shows a time division duplex (TDD) and FDD Configuration for DAS according to an embodiment of the invention.

The operation principle in FIG. 18 is similar to the operation principle shown in FIG. 9 and FIG. 10, except that the FDD method uses a duplexer but the TDD method uses a switch. Also, unlike the FDD method, the TDD method uses the same frequency for both DL and UL signals. Therefore, data is transmitted according to an allocated time, and a switch or a circulator and an attenuator are used to maintain the separation between DL and UL signals. Therefore, the detailed description will also be omitted here.

Figure 19:
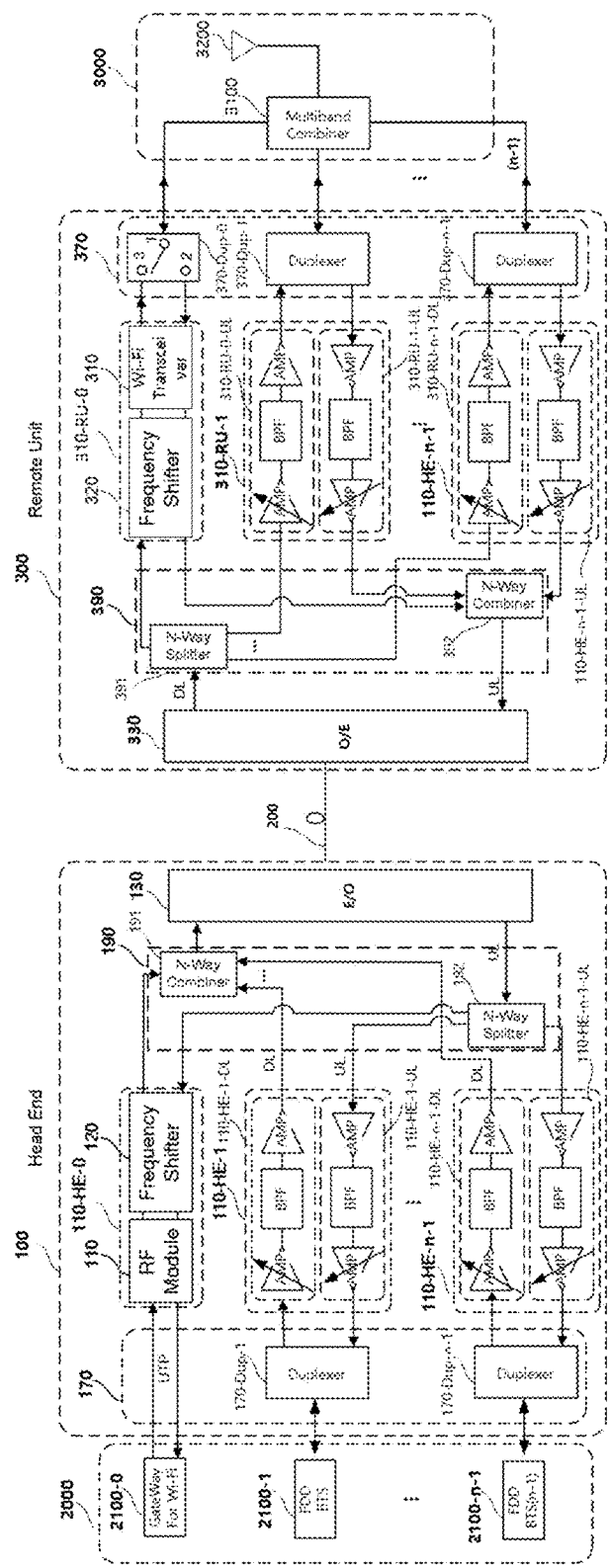
FIG. 19 is a schematic example of a Wi-Fi and FDD Configuration for a DAS of the specific configuration of the system of FIG. 12.

FIG. 19 shows a further detailed Wi-Fi and FDD configuration for DAS according to an embodiment of the invention. Operation is similarly as described in detail with respect to FIG. 15 and FIG. 16, and therefore further detailed description for FIG. 19 is generally omitted.

Notably in FIG. 19, a multiband combiner (3100) may include a commercial telephone service frequency band and a device for bundling the 2.4 GHz Wi-Fi band and the 5 GHz Wi-Fi band.

Figure 20:
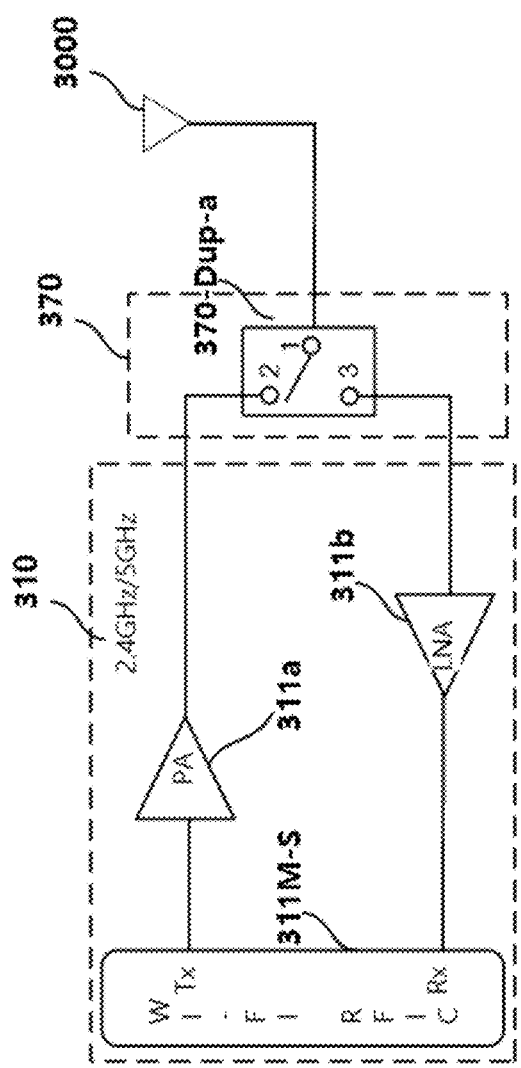
FIG. 20 is a schematic example of a Wi-Fi Transceiver with a radio frequency integrated circuit (RFIC) of the specific configuration of the Wi-Fi transceiver of an RU and frequency Shifter of the system of FIG. 19.

FIG. 20 is an internal configuration diagram of a Wi-Fi transceiver (310) of the module 310-RU-0 of the RU (300) of FIG. 19. The Wi-Fi transceiver (311M-S) includes an RF-baseband section and a baseband-RF section.

Figure 21:
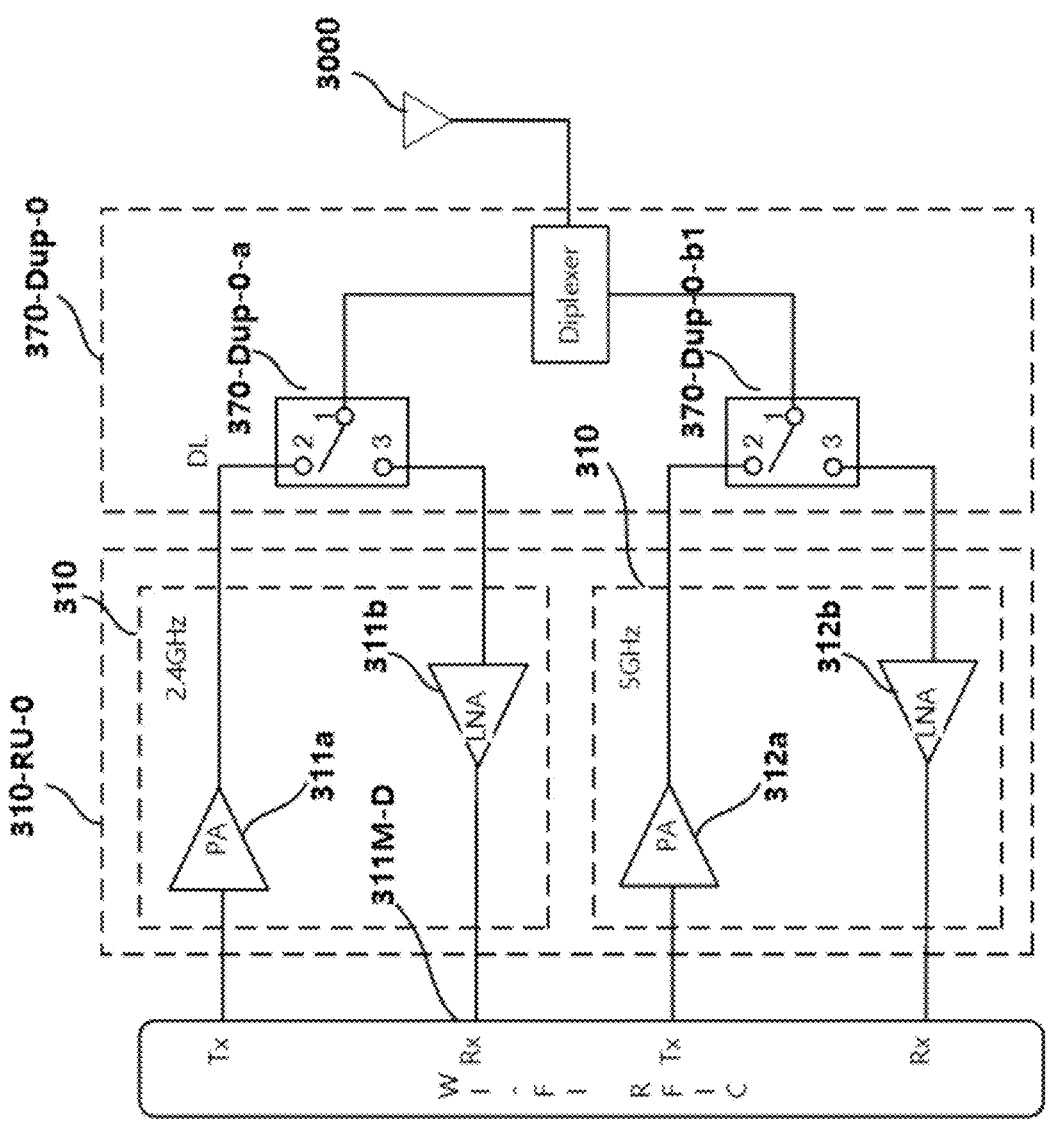
FIG. 21 is a schematic example of a Dual band Wi-Fi with Diplexer of the specific configuration of the Wi-Fi transceiver of an RU and frequency Shifter of the system of FIG. 19.
Figure 22:
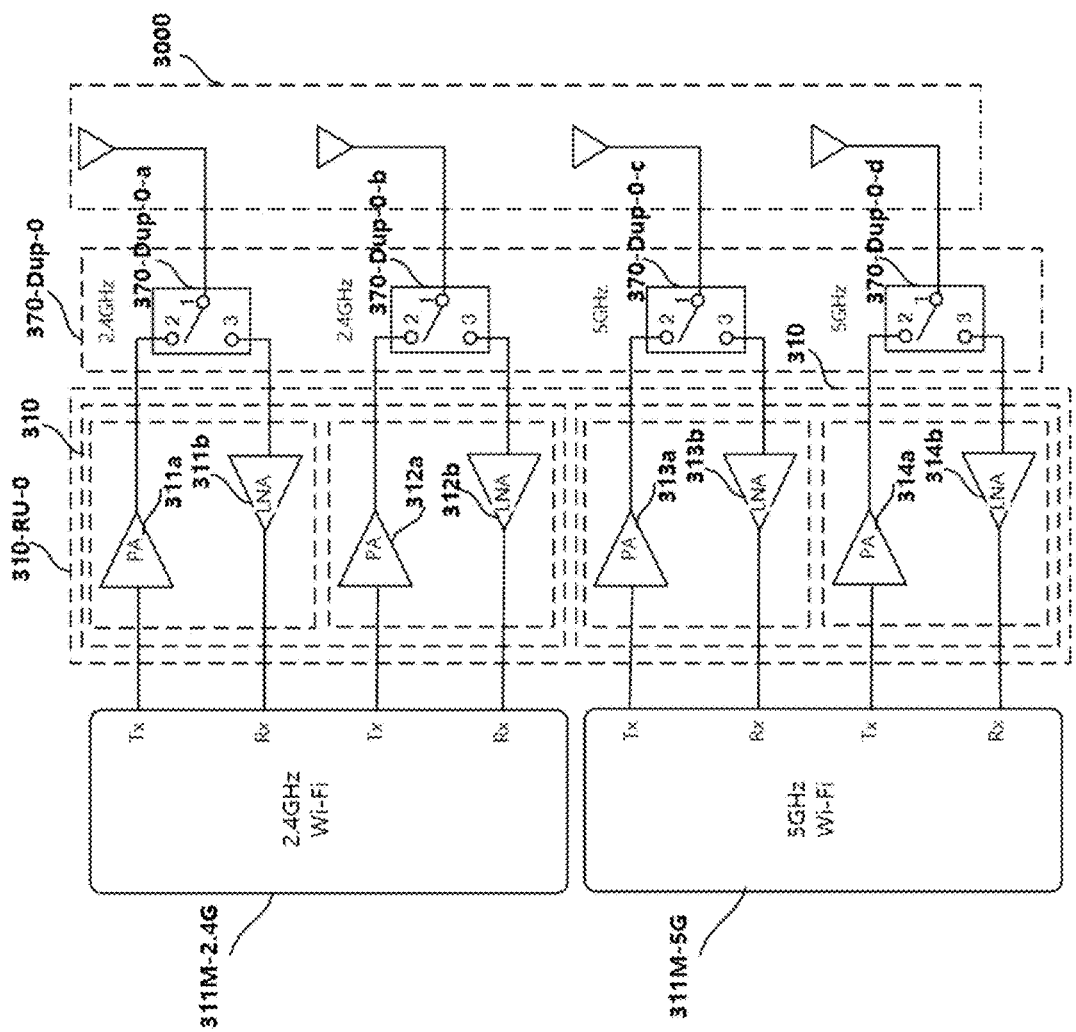
FIG. 22 is a schematic example of a Wi-Fi Range Extender of the specific configuration of the Wi-Fi transceiver of an RU and frequency Shifter of the system of FIG. 19.

FIGS. 21 and 22 illustrate examples of internal configurations of the Wi-Fi transceiver (310) of 310-RU-0 in FIG. 19 according to embodiments of the invention.

By broadcasting various types of communication signals, for example, to shaded areas through a single, integrated relay system, embodiments of the invention reduce installation costs and equipment manufacturing costs, compared for example, to those costs generated by installing the various relays separately for each communication service. Also, this invention is effective in preventing damage to buildings by installing one integrated relay system in a building, etc., rather than having to separately install multiple separate relay systems. Using existing installations, a large number of inputs and outputs of 4th generation and 5th generation communications can be transmitted simultaneously to reduce facility investment costs and installation costs.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A Distributed Antenna System (DAS) for Wi-Fi signals, the DAS comprising:
   a Head End (HE) configured to receive RF signals from at least one of a base station, a gateway, or a router, wherein the HE comprises a frequency shifter for converting frequencies of signals; and a plurality of Remote Units (RUs) each respectively connected to the HE over a single fiber optic cable, wherein each of the RUs comprises a frequency shifter for converting frequencies of signals; and a multiband combiner configured to bundle multiple signals together;

wherein the frequency shifter of the HE is configured to convert a downlink (DL) signal having a frequency in a DL frequency spectrum to a signal having a frequency in an Uplink (UL) frequency band when the HE transmits the DL signal to the RUs in a multi-band spectrum, and the frequency shifter of each of the RUs is configured to convert a UL signal having a frequency in a UL frequency spectrum to a signal having a frequency in a DL frequency band when the RU transmits the UL signal to the HE in a UL frequency spectrum.

2. The DAS of claim 1, wherein the HE is configured to receive massive MIMO signals from the at least one of the base station, the gateway, or the router, and the frequency shifter of the HE is configured to convert an original frequency of the received massive MIMO signals to one or more converted frequencies for transmitting the massive MIMO signals to one or more of the RUs.

3. The DAS of claim 2, wherein the frequency shifter of the HE is further configured to transmit the massive MIMO signals with the converted frequencies to the one or more of the RUs.

4. The DAS of claim 2, wherein the frequency shifter of the one or more of the RUs is configured to re-convert the one or more converted frequencies of the massive MIMO signals transmitted from the HE back to the original frequency of the received massive MIMO signals.

5. The DAS of claim 2, wherein at least one of the frequency shifter of the HE or the frequency shifter of at least one of the RUs comprises an analog modulator.

6. The DAS of claim 1, wherein the HE is configured to receive a high capacity Ethernet signal from the at least one of the base station, the gateway, or the router, and the frequency shifter of the HE is configured to convert an original frequency of the received high capacity Ethernet signal to a general commercial frequency band.

7. The DAS of claim 6, wherein one of the frequency shifter of the HE or the frequency shifter of one of the RUs is further configured to re-convert the frequency of the high capacity Ethernet signal transmitted from the HE from the general commercial frequency band back to the original frequency.

8. The DAS of claim 6, wherein the HE further comprises an apparatus configured to convert a frequency of an Ethernet signal received through an Ethernet cable from the at least one of the base station, the gateway, or the router to a Wi-Fi frequency.

9. The DAS of claim 6, wherein the HE further comprises an apparatus configured to convert a frequency of an Ethernet signal received from the at least one of the base station, the gateway, or the router to an arbitrary channel frequency within a Wi-Fi frequency band.

10. The DAS of claim 6, wherein at least one of the frequency shifter of the HE or the frequency shifter of at least one of the RUs comprises an analog modulator.

11. The DAS of claim 1, wherein the HE further comprises an RF module for adjusting the RF signals received from the at least one of the base station, the gateway, or the router.

12. The DAS of claim 11, wherein the RF module and the frequency shifter of the HE are formed in a single module in the HE.

13. The DAS of claim 1, wherein the HE further comprises a reference signal generator for generating a reference signal, and wherein the reference signal generator is configured to use a single reference signal in a multi-band spectrum when the HE is connected to the plurality of RUs.

14. The DAS of claim 13, wherein the HE and the each of RUs each comprises a prescaler or a frequency divider for matching a reference frequency of the RU to a frequency of the reference signal.

15. The DAS of claim 1, further comprising a frequency conversion unit configured to simultaneously transmit signals from a general commercial telephone service apparatus and signals from a Wi-Fi service apparatus to the RUs using a single medium.

16. The DAS of claim 15, wherein the single medium comprises a fiber optic cable or a coaxial cable.

17. The DAS of claim 1, wherein at least one of the frequency shifter of the HE or the frequency shifter of at least one of the RUs comprises an analog modulator.

18. The DAS of claim 1, further comprising a device configured to use a frequency conversion scheme to simultaneously transmit signals from a common commercial telephone service device and signals from a Wi-Fi service device using at least one of a frequency division duplex (FDD) method or a time division duplex (TDD) method over a single medium.

19. The DAS of claim 18, wherein the single medium comprises a fiber optic cable or a coaxial cable.

20. The DAS of claim 1, wherein the multiband combiner comprises a device that utilizes a commercial telephone service frequency band and a device for bundling a 2.4 GHz Wi-Fi band and a 5 GHz Wi-Fi band.

* * * * *